United States Patent [19]
Hoffman et al.

[11] 3,787,230

[45] Jan. 22, 1974

[54] METHOD OF APPLYING POWDER PAINT

[75] Inventors: Edward P. Hoffman, St. Louis, Mo.; Robert P. Sikorski, Clawson, Mich.

[73] Assignee: Grow Chemical Corp., New York, N.Y.

[22] Filed: Oct. 6, 1971

[21] Appl. No.: 187,137

[52] U.S. Cl............... 117/102 A, 117/63, 117/97, 117/104 R, 117/132
[51] Int. Cl....... B05c 11/10, B44d 1/06, B44d 1/08
[58] Field of Search... 117/104 R, 161 UB, 161 UZ, 117/102 A, 97, 132

[56] References Cited
UNITED STATES PATENTS

| | | | |
|---|---|---|---|
| 3,235,443 | 2/1966 | Greenman et al. | 162/135 |
| 3,293,114 | 12/1966 | Kenaga et al. | 162/168 |
| 3,687,885 | 8/1972 | Abriss et al. | 117/161 UZ |
| 3,410,719 | 11/1968 | Roper | 117/161 UB |
| 2,972,553 | 2/1961 | Hess | 117/104 R |
| 3,089,783 | 5/1963 | Carlson et al. | 117/104 R |
| 3,446,652 | 5/1969 | Smith | 117/104 R |
| 3,565,665 | 2/1971 | Stranch et al. | 117/21 |

*Primary Examiner*—William D. Martin
*Assistant Examiner*—M. Sofocleous
*Attorney, Agent, or Firm*—Burton and Parker

[57] ABSTRACT

Powder paint is applied to an article to be coated by forming a slurry of substantially uniformly suspended non-water soluble powder paint in water, while maintaining the powder in such substantially uniform suspension coating the surface to be painted with said slurry, and thereafter evaporating the water from the slurry coating and curing the powder paint to form a substantially continuous uniform paint film on the article. Where the slurry is applied by spraying, overspray is collected, the powder paint filtered therefrom and re-mixed in the slurry being sprayed.

7 Claims, No Drawings

METHOD OF APPLYING POWDER PAINT

FIELD OF INVENTION

This invention relates to a method of applying powder paint to articles to provide a uniform paint film thereupon.

BACKGROUND OF THE INVENTION

In the manufacturing of appliances, automobiles, and many other metal parts, protective and/or decorative paint coatings are conventionally applied in liquid form by either spraying, dipping, roll coating or brushing. The paint that is used consists of film formers, pigments and solvents, usually organic solvents, which act as a liquid carrier for the solids. After application of the liquid paint, it is dried, usually in an oven which serves to evaporate the organic solvents, and in the case of certain resin film formers, to complete the curing of the resin.

There are several disadvantages to the traditional methods of using liquid paint. First, up to 60 percent of the weight of the liquid paint is often solvent, which is not only wasted insofar as the final product is concerned since little if any of it forms part of the final paint film, but transportation and handling costs are directly related to the presence of the solvents in the liquid paint. Second, when the paint dries by evaporation of the solvent, an environmental air pollution hazard is created as there is no feasible economical technology available to recover the solvent. Third, a fire hazard is created by the evaporating solvent which is usually extremely flammable. These fire and air pollution hazards require the use of expensive ventilation equipment to reduce the danger to a tolerable level. Fourth, the solvent when vaporized is more reactive with the paint when in an enclosed space, such as a box member of an automobile door. This leads to "vapor wash" of the paint film leaving unprotected areas on the painted article which are then highly subject to corrosion. An object of this invention is to eliminate the foregoing disadvantages.

This invention utilizes powdered paints — paint which contains little or no solvent — in the existing equipment in current commercial use, thus obviating the need for changes in processes or for extensive capital investment. The previous powder coating technology applied the powder in dry form and required the use of substantially modified processes, for example, fluidized beds and electrostatic spraying. Also a potentially explosive environment was created by the powder atmosphere in such processes. The method of powder paint application herein disclosed minimizes if not completely eliminates this fire hazard.

Another object of the present invention is to achieve film thicknesses as thin as 5 to 25 microns (two to five ten-thousandths of an inch) which is not possible using currently available techniques, although normally the method dislosed herein will be used to produce films within the range presently in use in the paint industry. At the same time a hard, glossy paint film may be formed as thin as currently produced films from liquid paint. The fluidized bed technique will not produce films much below 150 microns, while electrostatic dry powder spraying can achieve films only as thin as approximately 15 microns (7/10 mil) thicknesses with special powders.

While the electrostatic dry powder spraying technique will produce films in the thickness range desired, it cannot coat the interior of articles as can a method involving dipping the articles into the paint. The present invention enables the interior of parts to be coated with a film utilizing powder paint.

SUMMARY OF THE INVENTION

The invention consists essentially in suspending particles of non-water soluble powdered paint in water. The slurry is then applied as a conventional paint, and the water evaporated out leaving the film former on the coated surface. As the water acts only as a carrier agent and each powdered paint particle comprises its own complete paint system, the water vapor given off during evaporation will not vapor wash the surface as was common in the prior art technique. The powder can be added to the water at the point of application and transportation and handling expenses thereby substantially reduced.

DESCRIPTION OF THE PREFERRED EMBODIMENT

This invention comprises the steps of suspending a powdered paint in water, then applying this mixture to the articles to be painted, evaporating the water, and curing the film in the usual manner. An essential requirement for the method is that the paint powder must be non-soluble in water. This prevents agglomeration of individual particles. There is no limitation on the kind of material the paint powder is made from, provided only that it is not soluble in water and may be treated to coalesce into a continuous fixed film on the coated surface.

While not absolutely essential to the practice of the invention, it is preferred that the particles of powdered paint be uniform in size, having a narrow distribution range. This promotes uniformity of film thickness after application. The narrower the size distribution of the paint particles, the more uniform will be the final coating.

The size of the average paint particles will largely determine the thickness of the final coat, though the consistency of the slurry and the concentration of powder in the slurry are also determining factors. This differs from electrostatic dry powder spraying in which the thickness depends essentially upon the charge placed upon the particles. According to the present invention the smaller the average size particle, the more evenly and uniformly will the object be coated. This is due at least in part to the fact that the smaller the powder particles the more easily are they uniformly suspended in the water.

If the size of the particles of powdered paint is small enough, e.g. below 50 microns, and preferably below about 20 microns, then only mild agitation is required to keep the paint from settling out once it has been thoroughly mixed with the water. Whether a given particle size will perform satisfactorily depends to some extent on the particular method of applying the slurry to the surface to be coated. For example, particle sizes larger than 20 microns, and as the size approaches 50 microns, would be less satisfactory for dip application as the larger particle size requires more vigorous agitation to maintain uniform distribution of the powder in the slurry. The larger particle sizes may be applied by spraying where a more vigorous agitation will keep the particles suspended just prior to emission from the spray gun. The smaller size particles, for example, from about 20 microns or less, are better suited to dip application. By utilizing small size particles, viz. 50 micron size or less, and preferably smaller than about 20 microns, chemical suspending agents may be omitted from the slurry, thereby avoiding any tendency of such agents to prevent flow out or coalescence of the powder in situ on the surface to be painted. In Examples I and II hereinafter set forth, the particle sizes ranged from 5 to 100 microns but the average size was 36 microns. Improved suspension and more accurately controlled, if not also thinner coatings may, however, be attained by a narrow range of particle size and smaller particles. Powder having particle sizes as small as 1 micron would appear quite satisfactory.

As to the amount of powder to be used in the slurry, based on my experimentation satisfactory films may be obtained where the amount of powder varies from between 10 to 60 percent by weight of the slurry.

Application of the mixture may be in any conventional manner. Of greatest importance are spraying and dipping. In a spray system, no modifications thereto are necessary if the powder particle size is sufficiently small, viz., less than about 20 microns, so that the normal agitation of the system keeps the powder from settling out. In dip applications, the tank containing the slurry may, if necessary, be provided with agitating means to keep the slurry in motion.

After the article is coated with the desired amount of paint, the water is removed either by simple air drying (flashing) or by blowing dry air over the wet article or by heating the article in an oven thus leaving a residue of powder upon the article. Following evaporation of the water the powder residue clings to the coated surface. Such residue is then treated to effect coalescence of the powder into a continuous film and finally setting or hardening to a fixed coating. Such treatment will depend on the nature of the powder paint, the nature of the article coated and other factors in the production painting process. The same oven as was used to evaporate the water may, for example, also be used to coalesce the powder into a continuous film on the coated surface. In the case of a thermoplastic powder paint, coalescence may be effected by heating and once the powder has coalesced into a continuous film coating, removal of the heat will cause the film to freeze. On the other hand a solvent for the powder in the form of a vapor may be directed against the powder to effect coalescence and formation of the film, and as the vapor dissipates the film will set to a fixed condition. In the case of thermosetting powder paint, the oven utilized to evaporate the water may also serve to effect coalescence and the thermosetting cure if desired.

A wide variety of film formers may be used as the basis for the powder paint contemplated by the method of application herein disclosed. For example, acrylic resins, alkyds, vinyls, polyesters, nylon, epoxy resins and others which will be apparent to those skilled in the art. Whatever film former is selected, it must not be water soluble and must be capable of coalescence and hardening to a fixed continuous film following evaporation of the water from the powder. Both hydrophilic and hydrophobic powders have been found to function satisfactorily, though in the case of hydrophobic powders a small amount of a surfactant may be necessary for wetting.

The following examples will illustrate the method:

I

A water slurry was prepared using, by weight, 37 percent of a non-water soluble wettable (hydrophilic), acrylic, high gloss, powder paint, in 63 percent de-ionized water (not more than 100 parts/million of insolubles). The powder had an average particle size of 36 microns and a distribution range of from 5 to 100 microns. The water and powder were mixed together using a Lightening mixer. The resulting slurry was sprayed onto one face of each of two panels using a conventional suction air-atomizing spray gun in a layer approximately 0.7 to 0.8 mil thick. One panel was then flashed for 10 minutes at room temperature and thereafter baked for 15 minutes in an oven at 350°F. The other panel was not flashed but immediately baked for 15 minutes at 350°F. Upon cooling both panels exhibited a glossy, smooth, uniform, non-porous, continuous non-tacky, hard, fixed paint film of good quality having a film thickness approximately 70 to 80 percent to that of the wet coating. The powder paint for this test was obtained from Farbenfabrikan Bayer AG, Germany, and is a self-wettable acrylic base paint intended to be applied by dry powder electrostatic spray coating.

II

A slurry was made in accordance with Example I and a quantity poured into a pair of one quart metal cans and sloshed therein to completely coat the interiors and any excess poured out. One can was then flashed for 10 minutes at room temperature and placed upside down on a panel and baked 15 minutes at 325°F. The other can was not flashed but immediately turned upside down on a panel and baked 15 minutes at 325°F. Upon removal from the oven the film coatings on the inside of the cans exhibited no evidence of vapor washing.

III

A water slurry was made using 100 grams of a water insoluble, hydrophilic, acrylic powder paint and 170 grams of de-ionized water. This powder had an average particle size of 40 microns and a distribution range of 100 percent below 100 microns. The powder and water were mixed together using a Lightening blender until the powder was uniformly suspended. The slurry was then sprayed onto a panel using a conventional suction, air atomizing spray gun, to a thickness of 1.1 mils, the panel flashed for 5 minutes and then baked fifteen minutes at 350°F. The final film was a semi-glossy, continuous, hard, fixed film of good appearance.

IV

A water slurry was made using 6 grams of a hydrophobic thermoplastic non-pigmented powder paint sold under the trademark HERCOFLAT 135 by Hercules Powder Co., Wilmington, Delaware, which is a polypropylene base, non-water soluble powder, 1/30 c.c. of a surfactant sold under the trademark AEROSOL OT 75 percent Active, and 50 grams of deionized water. This was mixed in a Lightening mixer until smooth and the powder uniformly dispersed in the water. The slurry was applied by spraying with equipment as before described on a panel to a thickness of approximately 0.7 to 0.8 mil, flashed at room temperature for 5 minutes, and baked at 350°F for fifteen minutes. Upon cooling the film was flat, continuous, fixed and transparent.

What is claimed is:

1. The method of painting comprising the steps of:

forming a slurry comprising from between 10 percent to 60 percent by weight of a non-water soluble acrylic powder paint having a particle size range of substantially 1 micron to 100 microns, with an average particle size of less than 50 microns and between 40 percent to 90 percent by weight de-ionized water, suspending the powder paint in a substantially uniform distribution throughout the water by physically agitating the slurry, while substantially maintaining such distribution applying a coating of the slurry to a surface to be painted, evaporating the water from the slurry coating, treating the powder to effect coalescence thereof in situ on the coated surface into a continuous paint film, and hardening the film.

2. A method of painting as in claim 1 wherein the powder paint is heated to effect evaporation of the water and coalescence of the powder.

3. A method of painting as in claim 1 wherein the slurry is sprayed on the surface.

4. A method of painting as in claim 1 wherein the article to be coated is dipped in the slurry.

5. The method of painting as in claim 1 wherein a solvent for the powder is applied thereto following evaporation of the water to soften the powder and effect coalescence.

6. The method of painting as in claim 1 wherein the slurry is sprayed on to the surface to be coated, collecting the overspray, filtering the powder paint therefrom, and re-mixing the powder paint thus filtered into the slurry being sprayed.

7. The method of painting as in claim 6 wherein the overspray is collected in a water curtain, collecting the water curtain and filtering the powder paint therefrom.

* * * * *